United States Patent
Clare

[19]

[11] Patent Number: 5,819,390
[45] Date of Patent: Oct. 13, 1998

[54] FABRICATION OF HIDDEN STORAGE/UTILITY SYSTEM

[76] Inventor: Scott Clare, 3381 Shawn Ct., Hayward, Calif. 94541

[21] Appl. No.: 936,471

[22] Filed: Sep. 22, 1997

Related U.S. Application Data

[63] Continuation of Ser. No. 685,678, Jul. 24, 1996, abandoned, Continuation-in-part of Ser. No. 506,893, Jul. 26, 1995, Pat. No. 5,567,000.

[51] Int. Cl.⁶ .................................................. B23P 11/00
[52] U.S. Cl. .......................... 29/430; 29/434; 224/404; 296/37.6
[58] Field of Search .................. 29/434, 430, 11, 29/897.2; 296/24.1, 37.1, 37.6, 181, 183; 224/402, 403, 404

[56] References Cited

U.S. PATENT DOCUMENTS

| | | | |
|---|---|---|---|
| 1,490,657 | 4/1924 | Botella | 296/37.1 |
| 1,990,757 | 2/1935 | Stiles | 296/37.6 X |
| 3,245,713 | 4/1966 | Ogilvie | 296/37.6 X |
| 3,727,971 | 4/1973 | Sisler | 296/37.6 |
| 4,685,695 | 8/1987 | LeVee | 296/37.6 X |
| 4,917,430 | 4/1990 | Lawrence | 296/376 |
| 5,127,519 | 7/1992 | Cooper | 296/37.1 X |
| 5,207,469 | 5/1993 | Rossi | 296/37.6 |
| 5,267,773 | 12/1993 | Kalis, Jr. et al. | 296/183 |
| 5,303,969 | 4/1994 | Simnacher | 296/37.6 |
| 5,316,358 | 5/1994 | Payne et al. | 296/37.6 |
| 5,421,645 | 6/1995 | Young | 296/37.6 X |
| 5,498,049 | 3/1996 | Schachter | 296/37.6 |
| 5,518,158 | 5/1996 | Matlack | 296/37.6 X |
| 5,615,922 | 4/1997 | Blanchard | 296/37.6 |

*Primary Examiner*—S. Thomas Hughes
*Attorney, Agent, or Firm*—L. E. Carnahan

[57] ABSTRACT

A pickup truck conversion hidden storage/utility system is incorporated in the bed thereof without altering the bed's external appearance. The storage system is located adjacent the wheel well sections of the bed, and uses hinges to open and close the fender/side panel of the bed. Since the storage system does not alter the truck's external appearance, it reduces the attraction for theft. Also, since the storage area does not extend inwardly beyond the conventional wheel wells, the storage system leaves most of the truck bed free for use. The hidden storage/utility system is incorporated into the bed by an initial fabrication method.

21 Claims, 4 Drawing Sheets

FABRICATION OF HIDDEN STORAGE/UTILITY SYSTEM

RELATED APPLICATION

This is a Continuation of application Ser. No. 08/685,678 filed Jul. 24, 1996, now abandoned which is a Continuation-In-Part of U.S. application Ser. No. 08/506,893 filed Jul. 26, 1995, now U.S. Pat. No. 5,567,000 issued Oct. 22,1996.

BACKGROUND OF THE INVENTION

The present invention relates to pickup trucks, particularly to storage/utility beds for pickup trucks, and more particularly to a storage/utility conversion or assembly method for providing same in a conventional pickup bed without altering the external appearance of the bed.

Pickup trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pick-up truck body and/or beds have been modified to provide storage/utility space, such as exemplified by U.S. Pat. No. 4,917,430 issued Apr. 17, 1990 to M. A. Lawrence.

While these prior storage/utility arrangements have been satisfactory for their intended purpose, such are an attraction for theft as well as having an appearance of a utility bed. Thus, there has been a need for a storage/utility system for pickup truck beds which does not alter the bed's external appearance or significantly reduce the interior size of the bed, thereby reducing the tool theft problem while providing space for hidden storage without significant reduction of the bed's carrying capacity.

This need has been filled by the present invention which involves the conversion or assembly of a conventional pickup truck bed into a storage/utility bed without altering the external appearance of the bed and without significant reduction in the carrying capacity thereof. This is accomplished by providing storage adjacent the wheel well area, and along the length of the bed, and providing the fender/side panel of the bed with a hinge and latch arrangement whereby the fender/side panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility beds.

SUMMARY OF THE INVENTION

It is an object of the present invention to provide a hidden storage/utility system for a bed, such as a conventional pickup truck bed, without altering the external appearance of the bed.

A further object of the invention is to provide a method for converting a standard pickup truck bed into a hidden storage/utility bed.

A further object of the invention is to provide a method for fabricating a bed with a hidden storage/utility system therein.

A further object of the invention is to provide a pickup truck bed with storage/utility capability without a significant reduction in the carrying capacity thereof.

Another object of the invention is to provide a pickup bed with storage/utility capability without altering the external appearance of the bed.

Another object of the invention is to provide a pickup bed with a hidden storage/utility system wherein the fender/side panel of the bed is hinged to allow access to the storage/utility area.

Another object of the invention is to reduce theft potential from a storage/utility bed of pickup trucks, etc. by providing hidden storage/utility areas in the bed without altering the external appearance of the bed.

Another object of the invention is to provide a standard bed, such as a pickup truck bed, with a hidden storage/utility system by converting an existing bed or by incorporation of the system during fabrication of the bed.

Other objects and advantages of the invention will become apparent from the following description and accompanying drawings. The invention involves a hidden storage/utility system for beds, such as pickup truck beds, that can be installed in any fleetside or stepside bed without altering the bed's appearance. The storage/utility system is installed in the wheel well area of the bed, and uses hinges to open and close the fender/side panel of the bed. The fender/side panel is provided with a latching and lock mechanism. Since the storage/utility system only involves the area of bed adjacent the wheel wells, it dos not significantly reduce the carrying capacity of the bed. By providing a hidden storage/utility system for a pickup truck bed, the potential of theft therefrom is substantially reduced since the unaltered appearance of the bed's external surfaces would not lead one to a realization that it contained tools, etc. The hidden storage/utility system can be initially fabricated in the bed, such as on an assembly line, or existing beds can be converted to include the system.

BRIEF DESCRIPTION OF THE DRAWINGS

The accompanying drawings, which are incorporated into and form a part of the disclosure, illustrate an embodiment of the hidden storage/utility system and fabrication methods for producing the system and, together with the description, serve to explain the principles of the invention.

DETAILED DESCRIPTION OF THE INVENTION

The present invention involves the fabrication of a hidden storage/utility system for a hidden pickup truck bed, for example, and involves a method for fabricating a bed to include the hidden system or for conversion of a conventional pickup truck bed to a hidden storage/utility bed without altering the external appearance of the bed, and without a significant reduction in the carrying capacity of the bed. While the invention is illustrated and described for fleetside and stepside versions of a pickup bed, it can be installed, either by initial assembly or conversion in any type of bed having available space. The present invention reduces the theft potential from storage/utility beds by eliminating the appearance of such beds. The invention utilizes lost space adjacent the wheel wells of the bed while maintaining the space between the wheel wells. As known, the space between the wheel wells of a conventional pickup truck bed is slightly over four (4) feet and the conventional pickup truck beds have a length of eight (8) feet plus, wherein sheets of 8 ft. by 4 ft. material, such as plywood, etc. can be carried between the wheel wells. However, the space in front and back of the wheel wells is generally considered lost space for large items until material has been stacked above the height of the wheel wells. Thus, by utilizing the area in front, back, and above the wheel wells as hidden storage/utility space, the overall storage/carrying capacity of the bed is increased between the outer fender and inner fender of a stock pickup by removing the inner fender. Here, the term storage/utility space is defined as that space in which tools, such as vices, saws, parts, etc. can be stored or mounted for use, and in which shelves can be secured for retaining such tools or parts, etc.

Figure 1:
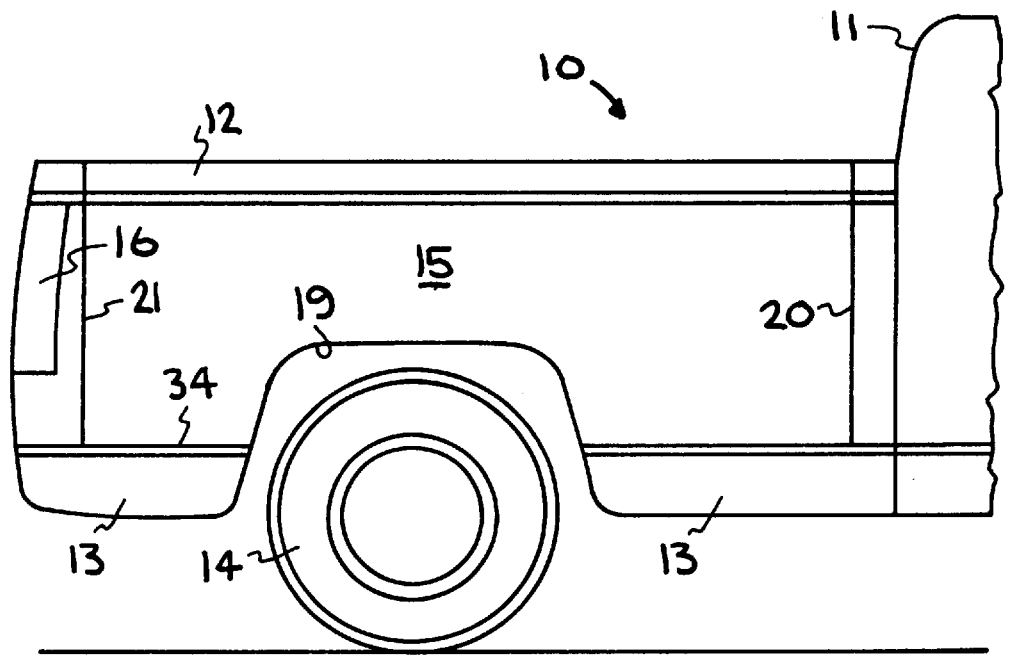
FIG. 1 is a view of a side of a pickup truck bed which has been modified to incorporate the storage/utility system under the closed fender/side panel of the bed in accordance with the present invention.

By the present invention, a conventional pickup truck bed is initially fabricated or converted to a storage/utility bed, whereas the conventional installation of storage/utility beds involve the replacement of the conventional bed, thus the cost of conversion compared to the cost of the conventional bed replacement is substantially less. Basically, the conversion involves cutting each fender/side panel (hereinafter called side panel) vertically in two places and along the upper length thereof, on an inner surface of the side panel, as described in detail hereinafter, disconnecting the lower length of the side panels from the bed frame, hinging the side panel along the upper length, providing braces on the side panels, installing a latching mechanism along the lower length of the side panels, providing a key lock for the latching mechanism, installing a storage structure or box over the wheel wells along each side of the bed, securing shelving to the storage box, and painting the cut areas and the storage box to correspond to the color of the bed. Upon completion of the conversion, from a side view, the only difference between the converted bed and a non-converted bed are two vertical lines or small spaces, one just back of the front of the bed and one just forward of the tail light section of the bed, where the side panel is cut, as illustrated in FIG. 1. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

The hidden storage/utility system can be initially fabricated into the bed, as in an assembly line arrangement, wherein the various parts are initially fabricated, then assembled and painted as the bed passes from station to station along an assembly line, as described in greater detail hereinafter.

Figure 2:
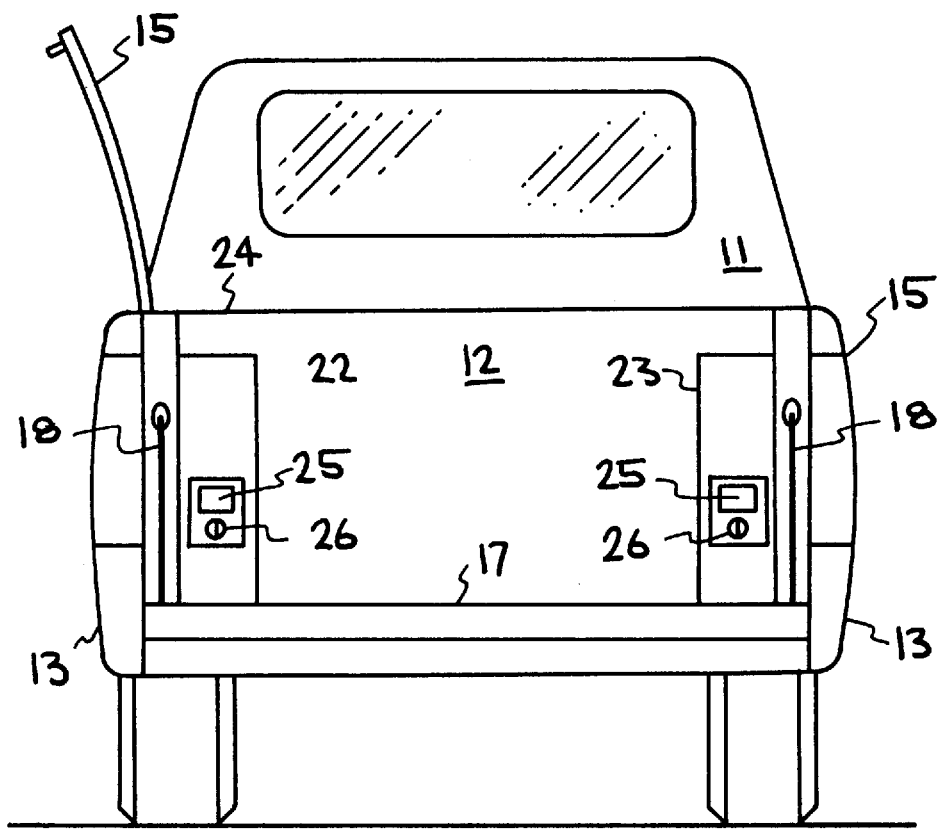
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab 11, bed 12, frame or undercarriage 13, and wheels 14. The bed 12 is mounted on frame or undercarriage 13 and includes side panels 15, a tail light arrangement 16, a hinged tail gate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
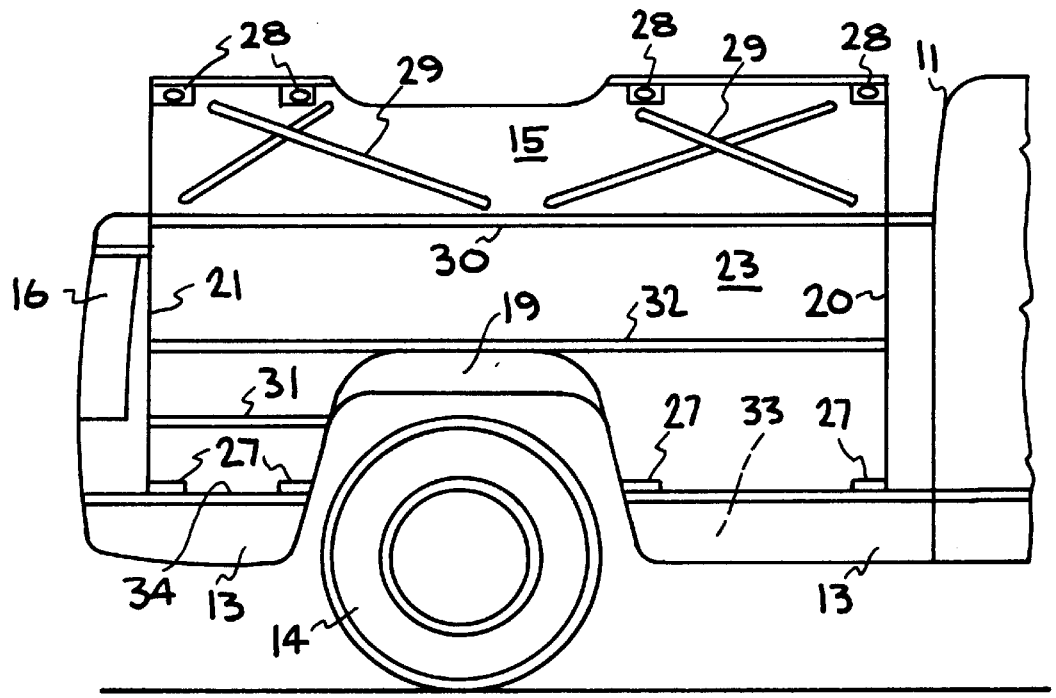
FIG. 3 is a view of an embodiment of the storage/utility system of the FIG. 1 pickup truck bed with the fender/side panel raised to illustrate the storage bin shelves and latch mechanism.
Figure 4:
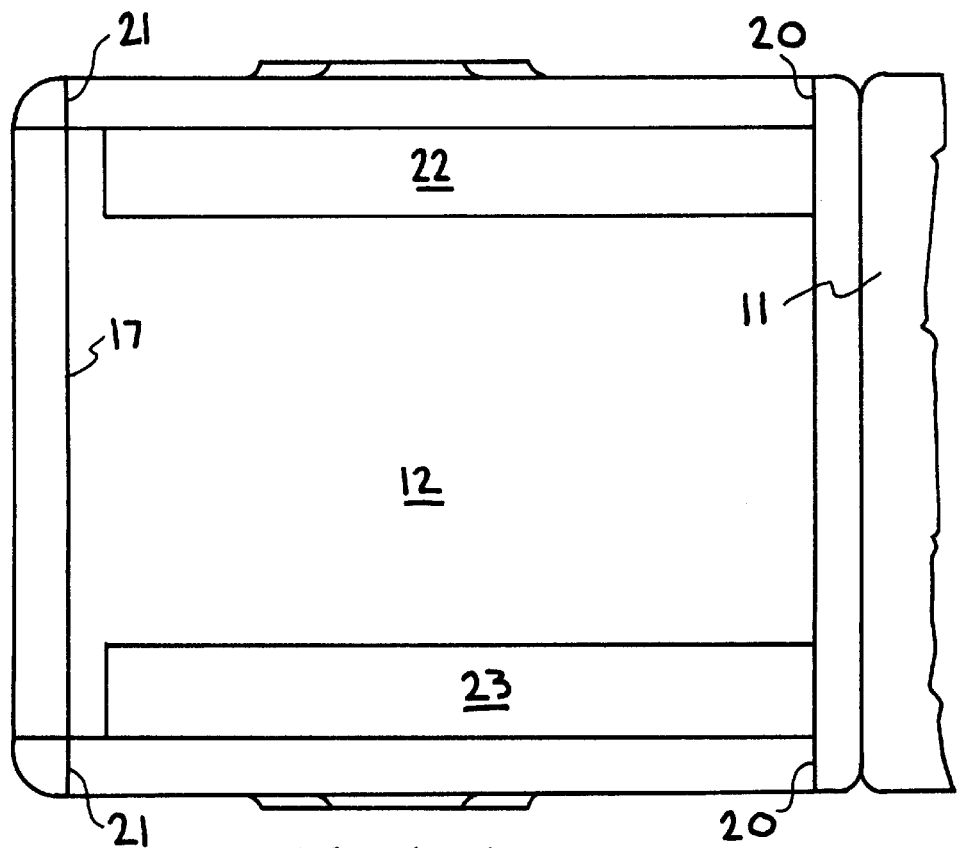
FIG. 4 is a top view of the FIG. 1 pickup truck bed illustrating the storage boxes and fender/side panels, with the tail gate closed.

As seen in FIGS. 2, 3 and 4, the hidden storage/utility area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tail gate 17. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as shown in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms a storage bin 33. The hinges 30 are located on the interior of the bed 12 and thus not visible from the exterior.

Figure 5:
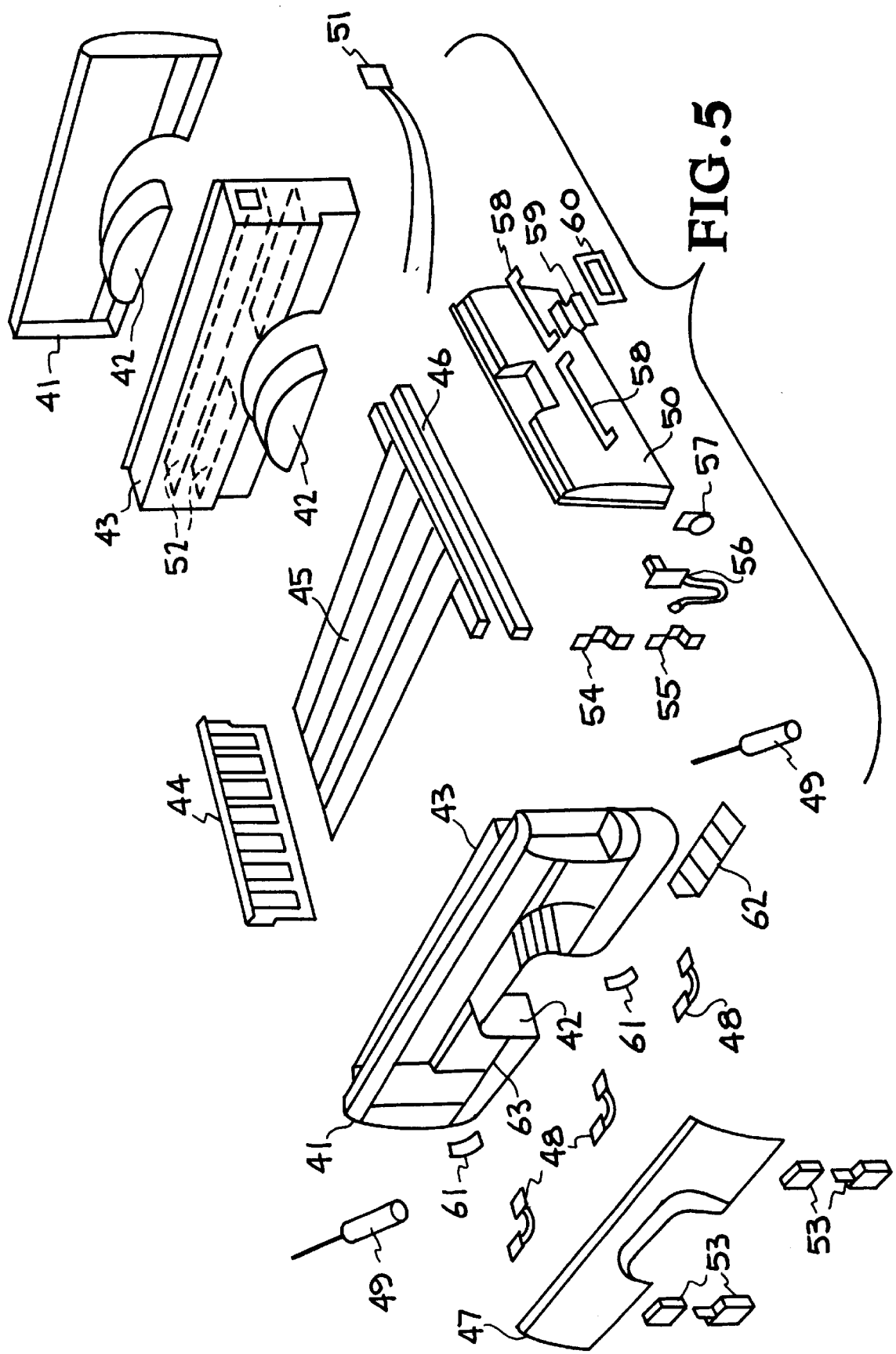
FIG. 5 is an exploded view of a fleetside or styleside light duty pickup bed incorporating the hidden storage/utility system.

FIG. 5 illustrates in exploded view an embodiment of a fleetside or styleside version of a light duty pickup truck bed incorporating the hidden storage/utility system, and which can be initially fabricated as a unit, or which can be formed by conversion of an existing bed. The initial fabrication process or method and the conversion process or method are described in detail hereinafter.

As shown in FIG. 5, the hidden storage/utility system comprises side panel assemblies 41 for either a short or long bed, wheelhouse panels 42, storage housing assemblies 43 for either a short or long bed, a front panel 44, a floor panel 45 for either a short or long bed, a floor sill 46, a door panel assembly 47, door panel hinges 48, panel door gas charged shock absorbers 49, a tailgate assembly 50, a storage box handle, lock and latch assembly 51, storage shelving assemblies 52, door panel lock and latch assemblies 53, tailgate striker 54, tailgate outer hinge 55, tailgate latch and cable assembly 56, tailgate inner hinge 57, tailgate latch rods 58, tailgate handle 59, tailgate bezel handle 60, a wheel opening 61, a side panel shield 62, and a panel door gasket 63. While only one part or component is shown for simplicity in certain instances it has a corresponding component on an opposite side not shown.

Figure 6:
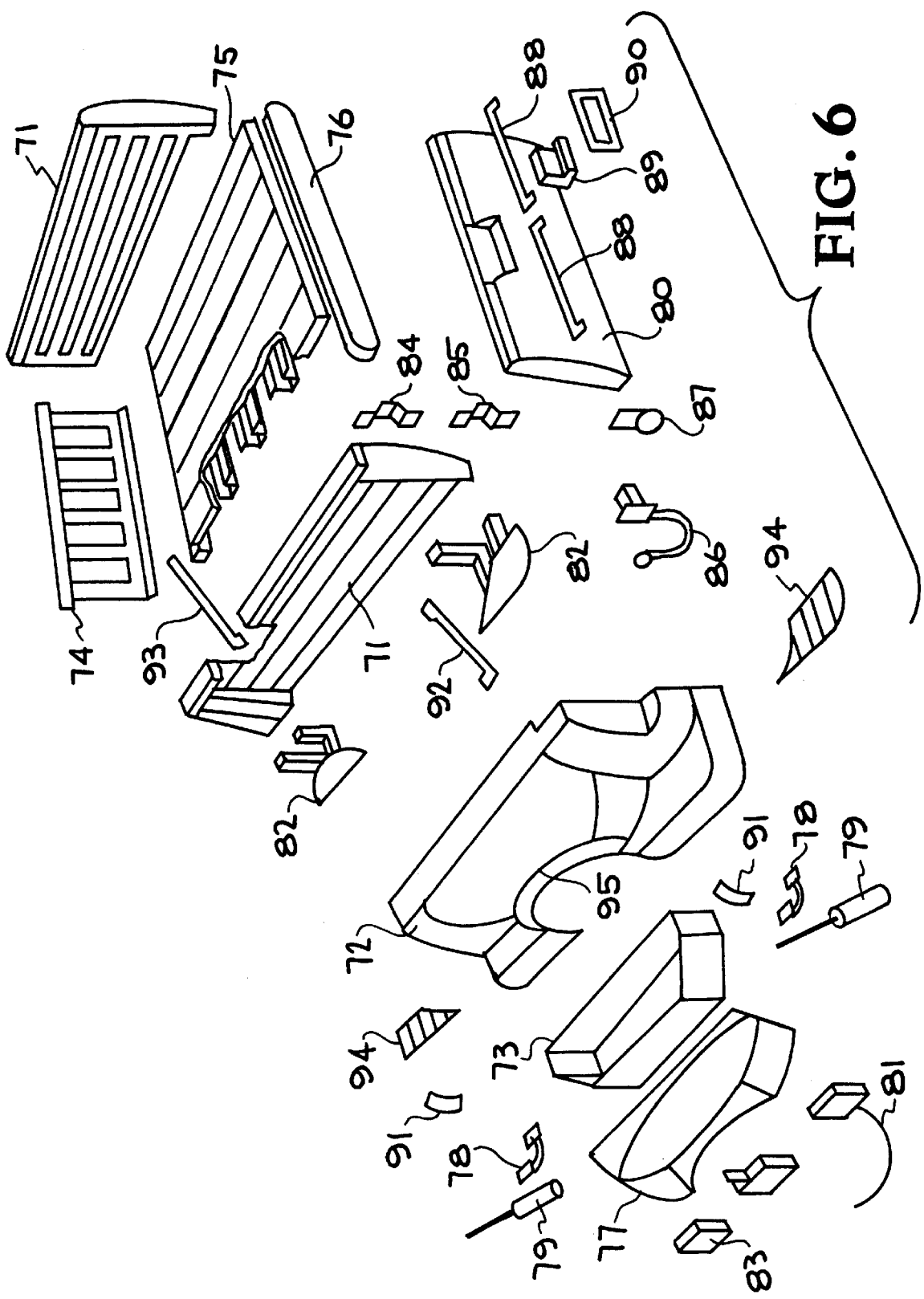
FIG. 6 is an exploded view of a stepside light duty pickup bed incorporating the hidden storage/utility system.

As shown in FIG. 6, the hidden storage/utility system can be incorporated into a stepside version of a light duty pickup truck bed, and comprises side panels 71 for long or short beds, fenders 72, only one shown, panel storage box assembly 73, front panel 74, floor panel 75 for long or short beds, a floor sill 76, door panel assembly 77, hidden door hinges 78, gas charged shock absorbers 79, tailgate assembly 80, latch lock and cable assembly 81, fender brackets 82, door panel lock and latch assemblies 83, tailgate striker 84, tailgate outer hinge 85, tailgate latch and cable assembly 86, inner hinge 87, latch rods 88, tailgate handle 89, bezel handle 90, wheel openings 91, fender rear brace 92, fender front brace 93, front and rear step pads 94, and door panel assembly gasket 95. While certain parts are shown singly for simplicity, corresponding parts not shown are utilized on the opposite side of the bed.

The invention involves a method for carrying out initial fabrication of a bed, for pickup trucks for example, which incorporates the hidden storage/utility system, as well as a method for carrying out the conversion of an existing conventional pickup bed, for example, to incorporate the hidden storage/utility system. In either case, the hidden storage/utility system is incorporated with substantially no change in the appearance of the external fender/side panel of the bed.

The conversion method can be utilized to enable damaged beds or existing undamaged beds to be modified to include the hidden storage/utility system. In the case of damaged beds, new fender/side panels and hidden storage assembly components are prefabricated in a jig system platform assembly similar to the initial fabrication method described hereinafter, but without the bed panel, front panel and tailgate assemblies, as illustrated in either of FIGS. 5 or 6. These prefabricated hidden storage system components are available for six foot, seven foot, and 8 foot pickup truck bed lengths, as manufactured for any light duty truck.

Conversion of Existing Bed

1. Remove the spare tire from under the bed for safety. Disconnect the fuel tank filler from the exterior side panel skin. CAUTION! Do not utilize a cutting torch or grinder or cutter where sparks fly that may ignite fuel in, around or near fuel tanks. Secure fuel tanks to avoid ignition PRIOR to beginning cutting.

2. Proceed to unbolt the existing bed from the chassis and disconnect wiring harness plugs. Remove the taillight assemblies. SEE CAUTION ABOVE: Cut the right and left side panels along the longitudinal axis of the bed panel and to the prescribed limit at the rear of the bed panel. Cut the front panel/side panel vertical joint loose. Preserve the last six inches of the bed panel adjacent to the tailgate bulkhead. This portion of the bed panel is utilized in the final bed construction.

3. Establish a level work station for the salvaged bed panel, front panel, tailgate and bulkhead assembly panels. The bed should be leveled along all axis. Plumb the front panel and tailgate bulkhead assembly. Secure jig the parts to the work station with cross rods and supports to prevent dislocation during retrofitting assembly.

4. Install the new side panel and storage panel assembly with wheelhouse to the bed panel and front and tailgate bulkhead. Check level and plumb positioning. Clamp the components securely into position. Install weld positioning clips and tack weld the hidden storage system into position. (Do not begin a full weldup at this time.)

5. Perform the identical installation on the opposite side of the bed. Check all tack welds. Check level and plumb and inside bed clearances and tolerances for both hidden storage system panels.

6. Install the hidden storage door panels to the hinge mounts (if the doors have been removed after shipment) and check form and fit. Do not force the door if an adjustment is required. Verify hinge adjustment position and door margin without gaskets. Special partial gaskets are provided to install in the annular space at premarked locations around the door to simulate margin fit without full gasket installation.

7. When all margins are verified, stitch weld the new hidden storage panel assembly to the bed panel along the provided weld clips. Following clip stitch welding, recheck bed tolerances, level and plumb. Complete the weldup, watching for heat distortion in bed components. Maintaining quality assurance conditions throughout the bed conversion reconstruction will ensure a precise and quality end product.

8. Remove light weld slag and wheel grind any unsightly weld, as required. Check form, fit and finish.

9. Prep the salvaged portion of the truck bed with standard Standing Painting Council methods for the auto industry, touch prime cleaned and sanded areas. Proceed to remove any rust or loose paint from the bed. Avoid moisture.

10. Lift the bed onto a rolling platform and place into a heated paint booth to volatilize moisture entrapped within joints of the bed. Prime the bed while warm. Cure the primer in accordance with the paint manufacturer's instructions. Check the primer surfaces inside and out. Sand out any imperfections. Verify mil thickness of the primer to specifications.

11. Caulk all seams and joints with the specified polymer. Allow the caulking to cure in the paint booth. Proceed with the final finish paint application. Verify finish quality. Allow finish to cure. Finish may be accelerated with ultra violet lamps according to manufacturer's instruction.

12. Install interior shelving and clips in hidden storage enclosures. Install gas lift shocks, locking latches, strikes, cable lock assemblies. Surround the annular door openings with the specified gasket materials. Install drain check valves in the fore and aft storage compartments. Verify form and fit. Door should close and secure without slamming shut.

13. Reinstall the truck bed on the truck chassis. Truck should be on a level slab at the time of reinstallation of the bed. verify tire wear and pressure prior to final level check.

14. Shim to level as required. Do not install excess shim stock materials. Bolt down the bed to the manufacturer's specified bolt torque settings.

15. Reinstall the spare tire, if required. Reinstall the tail light assemblies and reflectors and connect the wiring harnesses. Verify tail light, signal light and brake light operations. Verify the fuel tank filler neck and cap is securely attached to the side panel. Check gasket around fuel filler tube.

Original Equipment Manufacturing (OEM) Assembly Sequence

1. The manufacturing production and assembly of the hidden storage system begins in the forming and molding fabrication section. This is accomplished by means of stamp forming sheet metal into the pickup truck bed components in hydraulic presses with accompanying dies, breaks and shears.

2. Manufacture of the hidden storage system components may also be accomplished by means utilizing SCM (Structural Modified Composite) materials in molded or sheets goods.

3. Roll or flat stock forming sheet metal (with a thin coat of forming oil) is fed into a sizing shear die or forming die, if the material is precut. The process continues through subsequent sizing and forming die which progressively shape the bed panels for the front end, floor, wheelhouse, exterior and interior door and tailgate. Reinforcement, bulkhead, clips and shelving components are fabricated similarly by standard of the industry techniques. Metal structural components in the bed are not substituted with SMC material.

4. All metal components or SCM fabricated components are placed into an inventory system for final assembly. This manufacturing assembly procedure utilizes a JIT (just-in-time) parts system.

5. The final assembly of the fabricated and vendor outsourced components begin with feeding parts into a computer automated main assembly line conveyor system by means of a married computer automated spur conveyor system. Parts are fed upon demand controlled by a computer sequencer operation.

6. The basic bed structural components are conveyed to the automatic pin-fit jib robotic welding platform system which positions and locks the bed components of floor panel, front end panel, inside storage box panels, wheelhouse and tailgate bulkhead panel into a precise tolerance weld-up by means of utilizing state of the art robotic welding machines and associated platform positioning equipment.

7. The robotic welding machines retract and the jig system reverses lockup closure of the welded bed components allowing the chain conveyor to lift the bed into the next assembly sequence of bolting the pre-assembled tailgate door and hidden storage exterior door panel into the assembly held in position by means of special wire restraints to prop open the doors and tailgate for priming and final painting systems application.

8. The assembled bed proceeds into a highly illuminated booth to allow visual Q&A (quality and assurance) inspection for dolly, grinding and sandout correction of any minor surface imperfections prior to primer application. Special brazing is also accomplished at this stage in stress areas at the upper portion of the inside corners of the tailgate bulkhead.

9. After exiting the inspection and surface correction station, the bed progresses through a deionized water spray bed paint surface conditioning booth and then continues to be conveyed into the immersion primer bath. The welded bed is primed by means of an immersion bath system. The bed enters and leaves the primer bath at inclined positions to allow entrapped primer material to quickly drain from the bed and storage compartment areas. Strategic drain holes are provided to allow excess primer material to drain from entrapped areas.

10. Primer curing is accomplished by means of conveying the bed through a heated tunnel drying booth until the temperature reaches approximately 345–350 degrees Fahrenheit for the recommended time specified by the paint manufacturer as sufficient to cure the metal protection primer coat. The bed then progresses along the conveyor allowing cooling of the bed. The bed continues to progress into a second inspection station whereby the bed is highly illuminated by means of a lighting system along the walls and ceiling soffit areas allowing visual inspection for primer coat imperfections.

11. The next station is used to accomplish manual surface sanding of any surface defect, and hand spray touch up of the areas requiring correction of any minor aberrations found in the paint film surface. Rapid paint curing of touch up areas is accelerated by utilizing an ultra violet lamp which travels with the conveyed bed for approximately 8 minutes.

12. Caulking is then strategically applied over bed fabrication seams by means of a hand held caulking gun with controlled pressure fed in a precisely controlled manner, forming a smooth caulk bead for aesthetic reasons and preventing moisture from entering the bed joints to inhibit hidden rust formation.

13. After the drying booth and visual inspection sequence, the bed continues into the final color paint booth. Paint color is pre-selected and is automatically applied by means of a robotic turbo head paint applicator onto the bed. The bed is negatively charged and the paint is positively charged. The paint precipitates onto the bed components electrostatically.

14. Paint mil thickness application, if obtained by means of controlling the application term, fluid flow and speed of the robot. Inside of corners will require hand gun touch up paint application to obtain the specified mil thickness where discreet electrostatic precipitation deficiencies occur due to the physics inherent to automatic electrostatic paint application.

15. The bed paint drying and cure will then be processed by means of a tunnel oven which will allow temperature and time cure of the final paint coating. Heat is increased to a maximum of 345 degrees F. and slowly cooled as it progresses to the final visual inspection station.

16. The final visual quality assurance inspection is undertaken by the means of a high illumination booth. Units with surfacial imperfections in the paint are removed from the line and individually repaired manually with standard paint rub out techniques with recoat as required. Recoat paint cure is accelerated with an ultra violet paint lamp applied to the recoat surface for approximately 8–10 minutes.

17. The bed continues along the assembly line conveyor through final assembly component stages whereby the tailgate and hidden storage door hardware, including strikers, latches, locks, handles, cables, hidden latch assemblies, perimeter and specialty door gaskets, storage compartment drain check valving, wiring harnesses, tail light assemblies, shelving, shelving clips, shelving liners and manufacturing decals are manually installed or applied.

18. Final quality assurance inspection for form, fit and function is performed as the bed exits the assembly line. Special PVC plastic film is placed over bed areas subject to transport damage, and gas hatch covers to prevent opening by wind pressure.

19. The finished bed is lifted by means of a forklift and placed into a special rack designed for truck intermodel and low boy trailer shipment to stocking distributors.

It has thus been shown that the present invention provides a hidden storage/utility arrangement that can be initially built into a pickup truck bed, or a conventional bed can be converted to include the storage/utility arrangement without altering the external appearance of the bed and without a significant reduction in the carrying capacity of the bed. While the invention has been described with respect to fleetside and stepside pickup beds, it can be readily incorporated into other types of pickup beds, trailers or full-sized truck beds having side panels without detracting from the appearance of the side panels, except for the two vertical cuts therein. Also, the hinged fender/side panel can be hinged along the entire length whereby the entire side panel, including the tail light section, can be raised and lowered to eliminate the vertical cut lines. While a specific embodiment of the storage/utility system of the present invention has been described and illustrated, such is not intended to limit the invention to this embodiment. For certain applications only one storage box may be desired. Beds for pickups, trailers, and trucks are designed with differently constructed side panels and frame/undercarriage arrangements. For example, the bed 12 of FIG. 1 may extend downward to cover the frame or undercarriage 13, as shown, and thus the side panels 15 would include the extended area, or a cut, such as indicated at 34 in FIG. 3, can be made along a desired lower portion of the side panels to eliminate the need for raising the entire side panel when the extended area is part thereof.

Modifications and changes may become apparent to those skilled in the art, and it is intended that the scope of the invention be limited only by the scope of the appended claims.

What is claimed is:

1. A method of installing a hidden storage system in a vehicle bed having a predetermined external appearance during fabrication thereof without altering the external appearance, comprising:

assembling components to form a vehicle bed having side panels mounted on the exterior of the bed and at least one storage box extending along substantially the length of the bed, each side panel extending continuously along substantially the entire length of the bed, and horizontally hinging, at an upper portion thereof, at least one of said side panels along substantially the entire length of the bed such that substantially the entire length of the at least one side panel can be raised or lowered to expose or cover an interior of the storage box.

2. The method of claim 1, additionally including prefabricating the exterior side panels and the at least one storage box utilized to form the bed.

3. The method of claim 1, wherein the steps of assembling and hinging are carried out on an assembly line.

4. The method of claim 1, additionally including providing a lock and latch mechanism for the at least one side panel.

5. The method of claim 1, additionally including providing at least one shelf in the storage box.

6. The method of claim 1, additionally including assembling an additional storage box which extends along the length of the vehicle bed, and hinging another of said side panels along substantially the entire length of the bed so that the another side panel can be raised or lowered to expose or cover an interior of additional storage box.

7. A method for fabricating a storage system for a vehicle bed having a predetermined exterior appearance and having side panels mounted on the exterior of the bed without substantially altering the external appearance of the bed, the bed being adapted to be mounted on wheels, each side panel extending continuously along substantially the entire length of the bed, the method comprising:

forming a bed including a storage box on each side of the bed adjacent the side panels of the bed;

forming each storage box to include side walls and at least one end wall enclosing an interior;

hinging each of the side panels horizontally at an upper portion thereof along substantially the entire length of the bed so that substantially the entire length of each side panel can be raised to expose the interior of the adjacent storage box and lowered to cover the interior of the adjacent storage box without substantially altering the external appearance of the side panels when the side panels lowered; and providing each of the hinged side panels with a lock and latching mechanism for releasably securing the hinged side panels to the bed.

8. The method of claim 7, additionally including providing the interior of at least one of the storage boxes with at least one movable shelf.

9. The method of claim 7, additionally including prefabricating the storage boxes, the side panels and the lock and latching mechanisms and wherein the operations of forming of the bed and storage boxes, hinging of the side panels, and providing the lock and latching mechanism are carried out by assembling the above prefabricated components.

10. The method of claim 7, additionally including providing means for retaining the hinged side panels open.

11. The method of claim 10, wherein providing the retaining means comprise fluid containing reciprocal members.

12. The method of claim 7, additionally including forming the bed to include wheel wells, and forming each storage box to fit at least over the wheel wells of the bed.

13. In a method for assembling a bed for a vehicle comprising assembling a floor, a front panel, two side panels mounted on the exterior of the bed and a tail gate, each side panel extending continuously along substantially the entire length of the bed, improvement comprising providing hidden storage in at least one of the side panels of the bed by:

providing a storage box having an opening therein, positioning the storage box in the bed such that the opening is adjacent at least one of the two side panels, hinging horizontally at an upper portion thereof at least the one side panels adjacent the storage box so that moving substantially the entire length of the hinged at least one side panel exposes or covers substantially an entire interior of the storage box adjacent thereto, and providing entirely unexposed latching means for the hinged side panel.

14. The method of claim 13, further including positioning an additional storage box having an opening in the bed adjacent the other side panel and hinging the other side panel adjacent the additional storage box, and wherein the step of providing latching means further included providing latching means for the other hinged side panel.

15. The method of claim 13, additionally including forming the opening in the storage box to be of a longitudinally extending configuration.

16. The method of claim 13, additionally including forming the at least one hinged side panel prior to assembling the bed.

17. The method of claim 13, additionally including providing locking means for the at least one hinged side panel.

18. The method of claim 13, additionally including providing means for retaining the at least one side panel in an open position.

19. The method of claim 13, additionally including providing the floor of the bed with wheel wells, and forming the storage box to fit over the wheel wells and along the floor of the bed.

20. A method for fabricating a storage/utility system in a vehicle bed without substantially altering an external appearance thereof, comprising:

forming a bed to include a storage box on each side of the bed, the storage box having an opening extending along substantially the length of the bed;

forming at an upper portion of the bed a pair of horizontally hinged side panels, each side panel extending continuously along substantially the entire length of the bed such that the pair of hinged side panels are mounted on the exterior of the bed, extend along substantially the entire length of the bed and can be opened or closed to expose or cover an interior of the storage boxes; and providing latching and lock means for the side panels.

21. The method of claim 20, additionally including forming wheel wells on each side of the bed, and forming storage boxes to fit over the wheel wells.

* * * * *